United States Patent
Wagner

(10) Patent No.: US 9,060,071 B1
(45) Date of Patent: Jun. 16, 2015

(54) BLUETOOTH LOCATION IDENTIFIER AND GENERAL INFORMATION BROADCASTER

(75) Inventor: Christopher G. Wagner, Highlands Ranch, CO (US)

(73) Assignee: Oracle America, Inc., Redwood City, CA (US)

( * ) Notice: Subject to any disclaimer, the term of this patent is extended or adjusted under 35 U.S.C. 154(b) by 943 days.

(21) Appl. No.: 11/497,955

(22) Filed: Aug. 1, 2006

(51) Int. Cl.
*H04B 7/00* (2006.01)
*H04M 1/725* (2006.01)

(52) U.S. Cl.
CPC ...... *H04M 1/72577* (2013.01); *H04M 1/72572* (2013.01)

(58) Field of Classification Search
CPC ....... H04W 4/02; H04W 4/028; H04W 64/00; H04W 4/12; H04W 8/18; H04W 88/06; H04W 4/021; H04W 4/18; H04W 8/08; H04W 4/20; H04W 92/02; H04W 28/18; H04W 48/18; H04L 67/18; H04L 67/04; H04L 69/329; H04L 67/306; H04L 67/02; H04L 29/06; H04L 63/107; H04L 51/38; H04L 67/28; H04M 1/72572; H04M 2242/30; H04M 3/493; H04M 1/72569; H04M 2201/40; H04M 3/4938; H04M 1/72561; H04M 1/72566; H04M 3/54
USPC ............... 455/411, 435.1, 41.2, 556.1, 426.1, 455/26.1; 705/26, 59, 1; 126/299
See application file for complete search history.

(56) References Cited

U.S. PATENT DOCUMENTS

| | | | |
|---|---|---|---|
| 7,420,981 B2 * | 9/2008 | Zellner et al. | 370/412 |
| 2002/0087401 A1 * | 7/2002 | Leapman et al. | 705/14 |
| 2003/0061110 A1 * | 3/2003 | Bodin | 705/26 |
| 2004/0044629 A1 * | 3/2004 | Rhodes et al. | 705/59 |
| 2004/0092249 A1 * | 5/2004 | Sugikawa | 455/411 |
| 2004/0203638 A1 * | 10/2004 | Chan et al. | 455/414.1 |
| 2004/0203768 A1 * | 10/2004 | Ylitalo et al. | 455/435.1 |
| 2004/0216108 A1 * | 10/2004 | Robbin | 718/100 |
| 2004/0259500 A1 * | 12/2004 | Kim | 455/41.2 |
| 2005/0096084 A1 * | 5/2005 | Pohja et al. | 455/556.1 |
| 2005/0197115 A1 * | 9/2005 | Clark et al. | 455/426.1 |
| 2005/0203768 A1 * | 9/2005 | Florance et al. | 705/1 |
| 2006/0014547 A1 * | 1/2006 | Walter | 455/456.1 |
| 2006/0019645 A1 * | 1/2006 | Azimi et al. | 455/419 |
| 2006/0089914 A1 * | 4/2006 | Shiel et al. | 705/52 |
| 2006/0099965 A1 * | 5/2006 | Aaron | 455/456.3 |
| 2006/0135140 A1 * | 6/2006 | Rothman et al. | 455/418 |
| 2006/0234758 A1 * | 10/2006 | Parupudi et al. | 455/550.1 |
| 2007/0010261 A1 * | 1/2007 | Dravida et al. | 455/456.3 |
| 2007/0034203 A1 * | 2/2007 | Scattolini et al. | 126/299 R |
| 2007/0129012 A1 * | 6/2007 | Snow | 455/26.1 |

* cited by examiner

*Primary Examiner* — Golam Sorowar
(74) *Attorney, Agent, or Firm* — Brooks Kushman P.C.

(57) ABSTRACT

Systems and methods for controlling mobile devices are provided. A Bluetooth signal is received at a mobile device. The Bluetooth signal may include a broadcaster request which is configured to convey a set of desired actions to the wireless handheld device. Once the signal is received, the mobile device is able to determine if each action in the set of desired actions conveyed by the broadcaster request would be allowable on the mobile device. Then, the device performs each of the actions which have been determined to be allowable on the receiving device.

20 Claims, 5 Drawing Sheets

BLUETOOTH LOCATION IDENTIFIER AND GENERAL INFORMATION BROADCASTER

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2006 Sun Microsystems, Inc.

FIELD

Various embodiments of the present invention generally relate to systems and methods for controlling mobile devices. More particularly, embodiments relate to Bluetooth location identifiers and general information broadcasters for controlling mobile devices.

BACKGROUND

Mobile devices, such as cell phones, can be used in many locations where operation of the device would be disruptive or inappropriate. For example, telephone calls may be disruptive in locations such as churches, mosques, libraries, movie theaters, meeting rooms, and other places where silence is expected. However, in order to control the actions of a cell phone, a user currently has to pull the phone out and manually adjust a setting or mode to keep the phone from ringing. For example, in a movie theater the user must pull out their phone and either turn the phone off or adjust the ringer to vibrate. Then, once the movie is over, the user must remember to turn the phone back on turn the ringer back on.

One option currently available to certain venues is to install cell phone jammers. Cell phone jammers may be used to prevent cellular phones from receiving and transmitting telephone calls. While these devices can be used in many locations where a phone call would be disruptive, this may not be a great idea because if there is an emergency no signal is available.

Thus, a need exists for automatically controlling various features within mobile devices in certain locations.

SUMMARY

Systems and methods are described for controlling mobile devices. According to one embodiment, a Bluetooth signal is received at a mobile device. The Bluetooth signal may include a broadcaster request which is configured to convey a set of desired actions to the wireless handheld device. Once the signal is received, the mobile device is able to determine if each action in the set of desired actions conveyed by the broadcaster request would be allowable on the mobile device. Then, the device performs each of the actions which have been determined to be allowable on the receiving device.

In one embodiment, a broadcasting device embeds one or more broadcaster requests into a broadcast Bluetooth signal which may include information about an authority which has authorized the request. The broadcaster request, which may be configured to convey one or more of the desired actions to the receiving device, is then broadcast on Bluetooth frequencies.

According to one embodiment, system may include a memory store, a signal receiving module, and an implementation module. The memory store may have stored thereon one or more allowable actions that a receiving device is capable of performing when requested by an authorized broadcaster. The signal receiving module may be configured to receive one or more Bluetooth signals having encoded a broadcaster request which includes one or more requested actions. The implementation module may be configured to perform the one or more requested actions.

According to one embodiment, a computer-readable storage medium containing a set of instructions capable of providing instructions to one or more processors may be disclosed. The instructions may include instructions causing the one or more processors to receive a Bluetooth signal. The Bluetooth signal may include a broadcaster request configured to convey a set of desired actions to a receiving device. Additional instructions may cause the one or more processors to determine if each action in the set of desired actions conveyed by the broadcaster request are allowable on the receiving device. In some embodiments, the determination may be based at least in part on preferences stored in the device. More instructions may be included causing the one or more processors to perform each of the actions which have been determined to be allowable on the receiving device.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
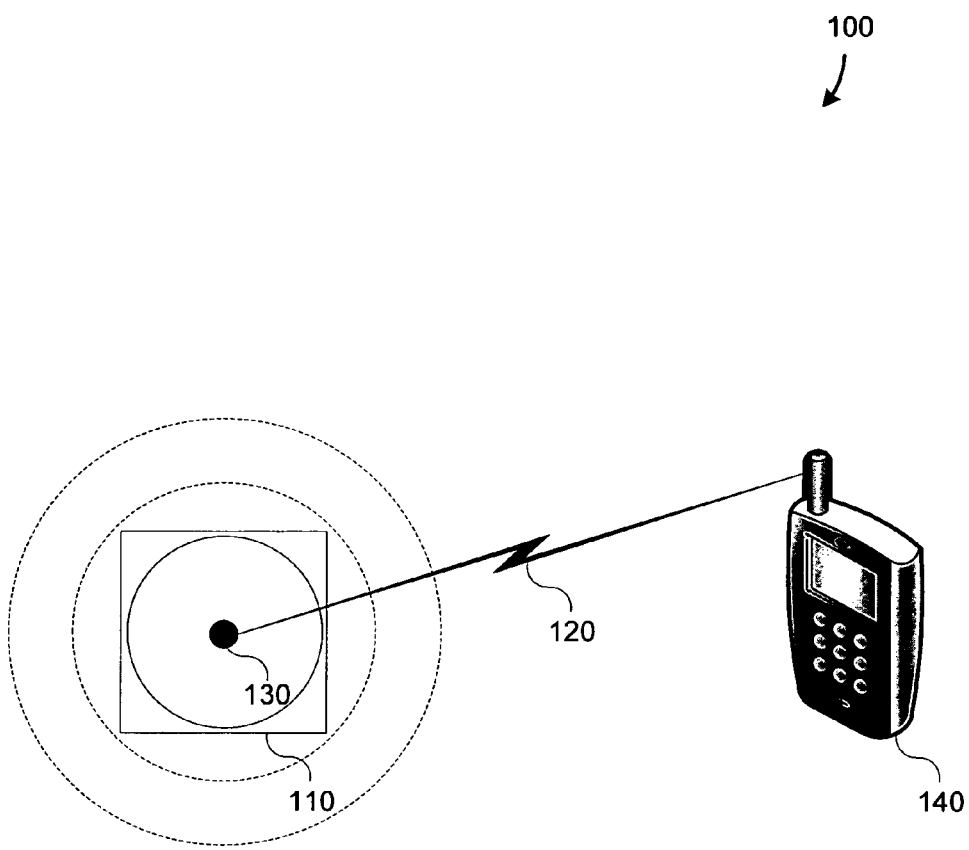
FIG. 1 illustrates one embodiment of a high level system diagram.

Embodiments of the present invention generally relate to systems and methods for controlling mobile devices. In particular, some embodiments relate to Bluetooth location identifiers and general information broadcasters for controlling mobile devices.

Various systems and methods are described in more detail below which allow for the control of a mobile device. Mobile devices such as cellular phones may be used to invade personal privacy, aid in corporate espionage, and the like. For example, camera phones may be used to take pictures of proprietary company information or used in locker rooms to take pictures of individuals. Still yet, in other venues, telephone calls may be disruptive. The loud ringing of a phone, for example, in libraries, movie theaters, meeting rooms, and other places where silence is expected, may be undesirable.

According to various embodiments of the present invention, location identifiers may be placed in desired venues. The location identifiers or broadcast sites may be configured to transmit one or more broadcast requests which request that one or more features of a mobile device may be activated, deactivated, or modified.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference to mobile devices such as cell phones, embodiments of the present invention are equally applicable to various other devices configured to receive Bluetooth signals.

For the sake of illustration, various embodiments of the present invention have herein been described in the context of computer programs, physical components, and logical interactions within modern communication networks. Importantly, while these embodiments describe various aspects of the invention in relation to modern communication networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices.

Terminology

The term "authority rating" generally refers to an indication of an entity making a request. Examples of authority ratings include, but are not limited to, a medical rating, an entertainment venue rating, government agency rating, an employer rating, an advertiser rating, private business rating, an emergency rating, and the like. In accordance with various embodiments, each general authority rating may have subcategories indicating the entity more specifically. An entertainment venue rating, for example, may have subcategories including one or more of a movie theater, coffee shop, sporting event, concert, and the like. A medical rating may have subcategories of private office, emergency room, hospital, and ambulance. Examples of government agency ratings may include state agencies and/or federal agencies. For example, police, fire, Federal Bureau of Investigation (FBI), Transportation Security Administration (TSA), Drug Enforcement Agency (DEA), Department of Homeland Security, and the like may be included as subcategories. In some embodiments, each general authority rating may also include subcategories for specifying the importance, or broadcaster priority, of the request being made. For example, a government agency rating may have two different levels; one for mandatory requests and one for optional requests. In some embodiments, more than two levels may be present. The authority rating and corresponding subcategories, if any, may be represented by a numerical string, an alphanumeric sting, an alphabetic string, or other systems known to those skilled in the art.

The term "broadcaster request" generally refers to a request made by an entity requesting that one or more desired actions be performed by receiving devices. In some embodiments, the broadcaster request is embedded within an unsecured Bluetooth signal and broadcast in one or more frequencies which are monitored by potential receiving devices. In accordance with some embodiments, the broadcaster request may include one or more actions such as displaying an informational bulletin, disabling a feature of the receiving device, enabling a feature of the receiving device, automatically altering a state of the receiving device, and the like. Examples of informational bulletins include, but are not limited to, weather reports, movie schedule, accident reports, road closures, scores of sporting events, advertisements, speed limits, and the like. In some cases, the desired action may be to disable one or more features of a receiving device. For example, if the receiving device is a cell phone, the request may include disabling the camera and/or video features of the phone, disabling outgoing calls, disabling incoming calls, or any other feature available on a cell phone. In other embodiments, the broadcaster request may request the receiving device to alter the state of the device. For example, in the case of a cell phone a request may be made to turn the phone to vibrate, to no ring, to loudest possible ring, to the previous state of the receiving device, to turn the device off, redirect incoming calls to another destination, to alter the voicemail message, and the like. In other embodiments, the receiving device may be integrated into an automobile. This type of receiving device may be configured to receive informational bulletins such as speed limits, Amber alerts, accident reports, current road conditions, and/or the like.

In some embodiments, the broadcaster request may include a set of unique identifiers with which one or more of the requested actions are associated. For example, an employer may want to limit his employees from making non-emergency phone calls during business hours. As such, a unique identifier may be associated with each of the employee's phones. These identifiers may then be programmed into the broadcaster request such that only outgoing calls of the employees would be limited, while allowing all outgoing calls originating from customer's phones.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection one with another. Based on the disclosure provided herein, one of ordinary skill in the art will appreciate a variety of ways in which connection or coupling exists in accordance with the aforementioned definition.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases "memory store" or "data store" generally refer to any device, mechanism, or populated data structure used for storing information. For purposes of this patent application, "memory store" or "data store" are intended to encompass, but are not limited to, one or more databases, one or more tables, one or more files, volatile memory, nonvolatile memory and dynamic memory. By way of further illustration, for example, random access memory, memory storage devices, and other recording media are covered by the phrase "memory store" or "data store." Common examples of a memory store include, but are not limited to, magnetic media such as floppy disks, magnetic tapes, hard drives and/or the like. Other examples of "memory stores" include SIMMs, SDRAM, DIMMs, RDRAM, DDR RAM, SODIMMS, optical memory devices such as compact disks, DVDs, and/or the like. In addition, a "memory store" may include one or more disk drives, flash drives, databases, local cache memories, processor cache memories, relational databases, flat databases, and/or the like. This list is no way meant to be an exhaustive list of devices and/or data structures falling with in the definition of "memory store," but is instead meant to highlight some examples. Those skilled in the art will appreciate many additional devices and techniques for storing information which are intended to be included within the phrase "memory store."

Exemplary High Level System Diagram

FIG. 1 illustrates a high level system diagram 100 in accordance with one or more embodiments of the present invention. System 100 includes at least one location identifier or broadcast site 110, which may be configured to broadcast unsecured and/or secured broadcast requests 120 on a Bluetooth channel using one or more broadcast devices 130. System 100 may also include one or more potential receiving devices 140 which are capable of monitoring for Bluetooth communications. The potential receiving devices 140 are typically mobile devices. According to various embodiments, some of the mobile devices may be handheld while others may be integrated into other structures such as automobiles, motorcycles, buses, bus stops, watches, and the like. According to various embodiments, receiving devices may include, but are not limited to, cell phones, smart phones, computers, handheld devices, personal digital assistants (PDA), and/or the like.

Bluetooth based communications, which may be used in accordance with various embodiments of the present invention, are typically around the 2.45 GHz band from 2.402 GHz to 2.480 GHz. The Bluetooth protocol divides the band into 79 channels (each 1 MHz wide) and changes channels up to 1600 times per second. Bluetooth signals are low power signals meant to communicably couple devices. One advantage of using the Bluetooth protocol is that the transmitting and receiving devices do not have to be in line of sight of each other in order to communicate. As known to those skilled in the art, different antenna designs, transmission path attenuations, and other variables result in variable ranges of operation. There are, however, currently three classes of Bluetooth broadcasters available. A class one device has a range of approximately 100 meters. A class two device has a range of approximately 10 meters. A class three device has a range of approximately 1 meter.

The strength of the broadcast site signal 120 may be chosen based on the venue, desired range of the signal, and reason for the signal. For example, if the purpose of the signal is to disable the camera feature of a cell phone in a locker room, a class two device may be sufficient depending on the size of the locker room. In the case of large venues, multiple broadcast sites may need to be utilized to have the desired effect.

In some embodiments, the broadcaster request 120 may be embedded within an unsecured Bluetooth signal and broadcast in one or more frequencies which are monitored by potential receiving devices. In other embodiments, the broadcaster request is embedded within a secured Bluetooth signal which can only be read by authorized receiving devices. Whether the request is transmitted on secure or unsecured Bluetooth signal, the broadcaster request 120 may include one or more actions such as, but not limited to, displaying an informational bulletin, disabling a feature of the receiving device, enabling a feature of the receiving device, automatically altering a state of the receiving device, and the like.

Examples of informational bulletins include, but are not limited to, weather reports, movie schedule, accident reports, road closures, scores of sporting events, advertisements, speed limits, and the like. According to one embodiment, when an informational bulletin is received and displayed, an associated audible alert may also occur to alert the user. In some cases, the desired action embedded within the broadcaster request 120 may be to disable one or more features of the potential receiving device 140. For example, if the receiving device is a cell phone, the request may include disabling the camera and/or video features of the phone, disabling outgoing calls, or any other feature available on a cell phone. In other embodiments, the broadcaster request may request the receiving device to alter the state of the cell phone. For example, a request may be made to turn the phone to vibrate, to no ring, to loudest possible ring, to the previous state of the receiving device, to turn the device off, redirect incoming calls to another destination, to alter the voicemail message, and the like.

In accordance with one embodiment, the desired action may also indicate a time limit for which the desired action should be performed on the receiving device. For example, cell phones are not allowed on commercial flights. Since the duration of the flight is known, a time for which the phone must remain off may be embedded within the request and then broadcast just before the flight leaves the terminal. As another example, a movie theater may request that phones be set to vibrate during a movie. Since the duration of the movie is known, a command may be sent to the mobile device which requests that the state of the ringer be set to vibrate for the time period. In some embodiments, after the period of time indicated in the broadcaster request has expired, the device may return to its original state. In other embodiments, after the period of time has expired the device may remain in the modified state, but now allow the user to manually set it to another state.

In some embodiments, the broadcasting site may be chosen such that it is in a place where everyone must pass in order to gain entry to the venue. The ticket entrance to a movie theater is one example of a location everyone must pass to gain entry in a movie theater. In this case, a lower power site 110 may be used as everyone must pass this area in order to gain entry.

One advantage of this approach is the power savings gained by the broadcasting site since the signal may only need broadcast for a shorter period of time. Another advantage is that lower power and/or fewer broadcasting sites may be used to achieve the same result. In some embodiments, the broadcasting sites may be configured with motion detectors which activate the broadcasting of the signals when motion is detected.

Figure 2:
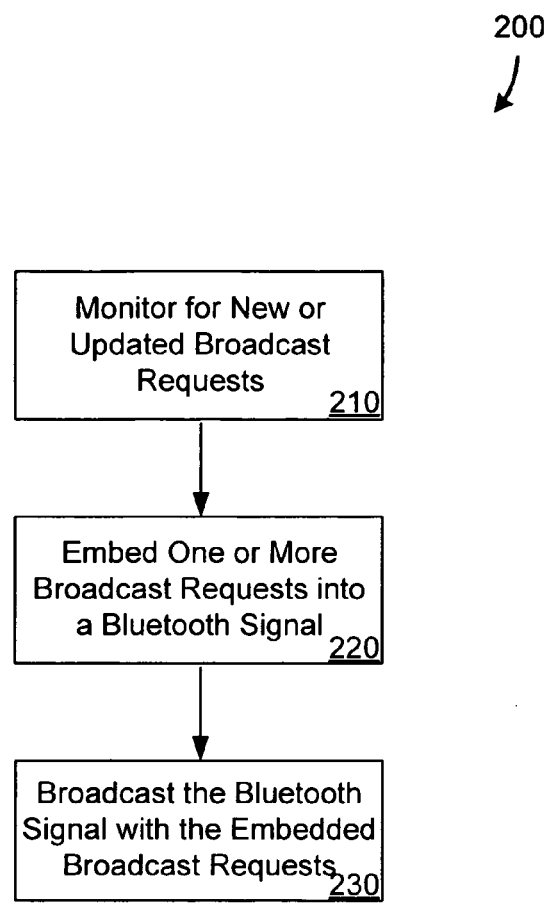
FIG. 2 is a flow chart illustrating one embodiment for operation of a broadcasting device.

FIG. 2 is a flow chart illustrating an exemplary operation 200 of a broadcasting device in accordance with various embodiments of the present invention. A broadcasting device may be one of several within a broadcasting site or it may be the only one.

At processing block 210, the broadcasting device monitors for new or updated broadcast request. These updates or new requests may be received from a programming device, such as a computer, (not shown) which is communicably coupled to the broadcasting device. According to one embodiment the location identifier or broadcasting site may be a small device capable of communicating with the computer via a USB port, wireless communication, and other systems known to those skilled in the art.

Using the computer interface, a user may select, set, or program one or more desired actions to be embedded within a broadcaster request which will be transmitted from the broadcasting site 110 using Bluetooth protocols. The desired actions, may include, but are not limited to displaying an informational bulletin, disabling a feature of the receiving device 140, enabling a feature of the receiving device 140, automatically altering a state of the receiving device 140, and the like.

Once a new or updated request has been received, the request is embedded within one or more broadcast requests which are capable of being broadcast on a Bluetooth system at processing block 220. According to one embodiment, the request is embedded by a computer or other programming device before transferring it to the broadcasting device. In other embodiments, the request is transmitted from a computer or other programming device to the broadcasting device where the request is then embedded.

At processing block 230, the broadcasting device broadcasts the request. According to some embodiments, a time period may be specified within which the broadcasting is to take place. These time periods may be based on a user-defined schedule, a periodic schedule, a one-time occurrence, and the like. The broadcasting device may monitor either an internal or external clock and automatically transmit the broadcast signal during the appropriate time period. In other embodiments, an external trigger may be used to activate the transmission of the broadcaster request. For example, the external trigger may be a signal received from a button which is activated by an end user, a signal from a signaling device. The signaling device may be a mechanical device, an electrical device, an electromechanical device, or other mechanism known to those skilled in the art. The signal may be based upon one or more inputs and/or other events, or one or more signals from sensors such as motion detectors.

Once the signal is transmitted by the broadcasting device, the signal may be received by one or more potential receiving devices within the range of the broadcasting device. According to various embodiments, a potential receiving device may include software components, hardware components, or a combination thereof which have been configured to receive Bluetooth signals with embedded broadcaster requests, determine if these requests should be allowed, and then perform the allowable actions.

Figure 3:
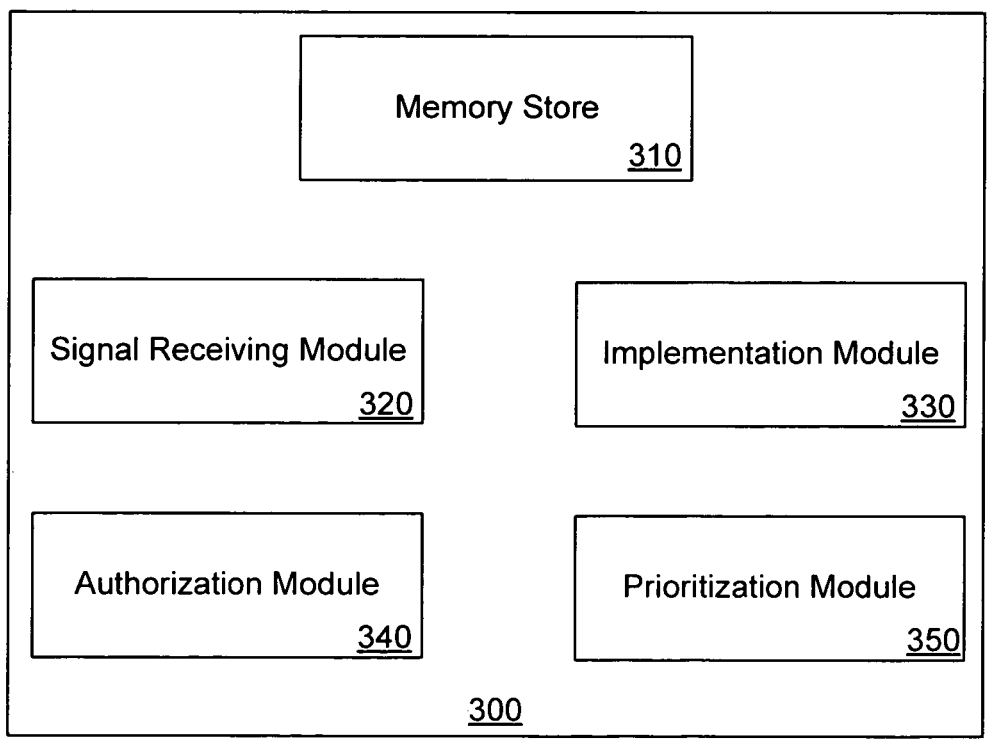
FIG. 3 is a block diagram illustrating one embodiment of a receiving device.

FIG. 3 is a block diagram illustrating one embodiment of a potential receiving device. According to one embodiment, the potential receiving device 300 may include one or more of a memory store 310, a signal receiving module 320, an implementation module 330, an authorization module 340, and a prioritization module 350. In some embodiments, one or more of the modules may be implemented using software, hardware, and/or a combination thereof. In some cases, the modules may all be contained within a single housing. While in other cases, some of the modules present may be within a main structural housing while the other modules may be housed in one or more secondary housings which are communicably coupled to the main housing.

According to one embodiment, a memory store 310 may be included in the potential receiving device. As previously described, a memory store 310 generally refers to any device, mechanism, or populated data structure used for storing information which is known to those skilled in the art. A memory store, used in accordance with various embodiments, may have stored thereon one or more allowable actions that a receiving device is capable of performing based on a request by an authorized broadcaster. In some embodiments, associated with one or more of the stored actions is a preference or rating capable of being considered when the actions are being prioritized. The preferences may be built-in or user defined.

In one embodiment, a signal receiving module 320 configured to receive one or more Bluetooth signals may be included in the potential receiving device. Signal receiving module 320 may be able to receive one or more broadcaster requests which include one or more requested actions. In some embodiments, signal receiving module 320 may be communicably coupled to memory store 310 which is capable of storing the received broadcaster request for later analysis by an implementation module 330 or prioritization module 350. However, in other embodiments, the receiving module may be communicably coupled to the implementation module 330 and/or the prioritization module 350 through one or more buffers.

In an embodiment, implementation module 330 may be configured to perform the one or more requested actions. Implementation module 330 may be implemented using hardware, software, or a combination thereof. In one embodiment, implementation module 330 may be communicably coupled to an authorization module 340 and/or prioritization module 350. As such, once a prioritization has been determined for a requested action, this information may then be accessed by, or transmitted to, the implementation module 330. Using the prioritization information and/or authorization information, implementation module 340 may implement the requests.

In another embodiment, implementation module 330 may be communicably coupled to memory store 310. The implementation module may use settings and preferences stored in the memory store to aid in making the determination of if and when the requested action should be performed.

Authorization module 340 may be utilized in some embodiments. According to one embodiment, authorization module 340 determines which, if any, of the received broadcaster requests should be performed on the receiving device. According to one embodiment, authorization module 340 is communicably coupled with signal receiving module 320. When a broadcaster request is received, the authority rating and any receiving device identifications associated with the broadcaster request are determined. Using this information, the authorization module is able to determine if the one or more desired actions embedded within the broadcaster request should be authorized. For example, the authority rating may indicate an entity making a request such as a medical entity, an entertainment venue, a government agency, an employer, an advertiser, private business, an emergency entity, and the like. Then, using this information along with settings and/or preferences of the user, the authorization module may make a determination of whether the requested action should be authorized.

In one embodiment, once a requested action is authorized, prioritization module 350 may be used to associate a priority level with the requested action. Prioritization module 350, at least according to one embodiment, may consider and weight such factors as an affiliated importance of the request, resource utilization in order to process the request, effect the request will have on other requests, user-defined preferences, built-in system preferences, time the request was received, and/or other factors known to those skilled in the art. For example, this may be done using optimization techniques known to those skilled in the art. In some embodiments, a first in first out queue may be used to set the order the requests will be processed.

Figure 4:
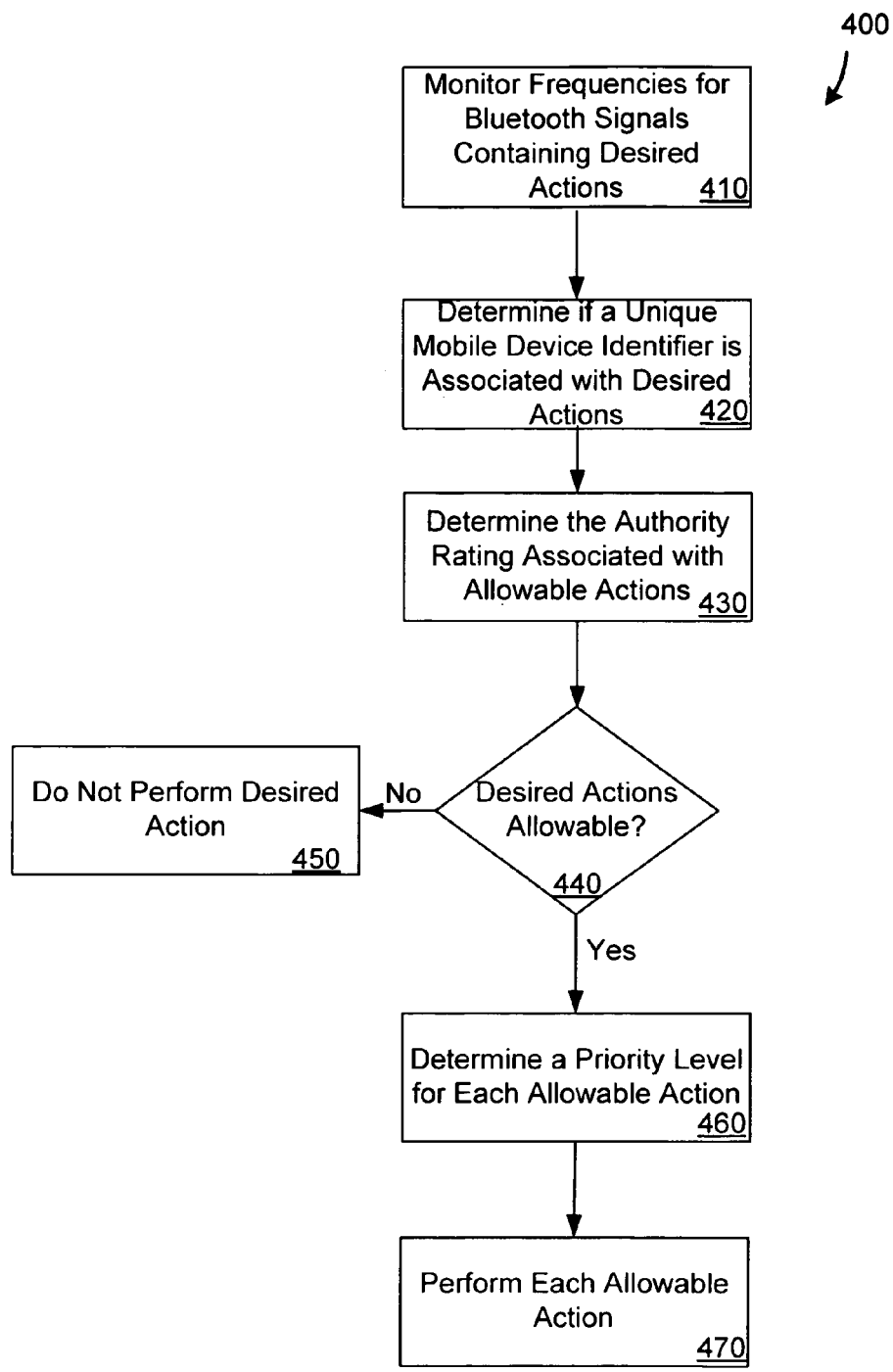
FIG. 4 is a flow chart illustrating one embodiment for operation of a receiving device.

FIG. 4 is a flow chart illustrating one embodiment of operation of a potential receiving device. A potential receiving device receives one or more Bluetooth signals with embedded broadcaster requests, determines if the desired actions embedded within these broadcaster requests should be allowed, and then performs the allowable actions.

At processing block 410, a target receiving device monitors various unlicensed ISM band frequencies around 2.4 Ghz for Bluetooth signals which contain desired actions embedded within broadcaster requests. Once a Bluetooth signal is found by a receiving device, the device decodes the embedded broadcaster request, if it is encrypted. Then, the device determines at processing block 420 if a unique mobile device identifier is associated with one or more of the desired actions found within the broadcaster request. In some embodiments, the unique identifier may identify a unique device, a group or class of devices, or devices with certain features.

For example, an employer may only wish to disable or limit his employees from making non-emergency phone calls during business hours. By embedding a unique identifier associated with the employee's phones in the broadcaster request, a customer's phones will not be targeted by the broadcaster requests. As such, only outgoing calls of the employees would be limited, while allowing all outgoing calls of customers.

In accordance with some embodiments, only devices with certain features, such as camera or video features, may need to be targeted. If no device identifier is found, or an identifier indicating all devices is found, then all devices will consider the broadcasters request.

Once the receiving device determines the unique identifiers associated with the requested or desired actions, the receiving device then determines if an authority rating is associated with one or more of the desired actions, at processing block 430. Using the unique identifiers, authority ratings, and/or other information contained in the broadcaster request, the receiving device is then able to determine if each of the desired actions are allowable at decision block 440.

For example, as previously discussed a broadcaster request may have unique identifier associated with certain actions. If the receiving device does not have a matching or corresponding identifier to that found in the broadcaster request, then the request will not be allowable.

According to some embodiments, the mobile device may be configurable to only allow actions corresponding to user preferences. The user's preferences, according to one embodiment, may be programmed using one or more graphical user interfaces comprising drop down lists, radio buttons, and the like. One embodiment allows for the user of the mobile device to set the preference completely. For example, a broadcasting site may be configured to transmit promotional advertisements to attract people into stores as they walk by. However, a user may desire not to receive the advertisements and consequently set a preference within the user's device not to accept advertisements.

Other embodiments of the present invention allow for certain broadcasts to be received by a mobile device no matter what preference has been set by the user. One example includes a broadcast by police or other government agencies. In one embodiment, the mobile device is able to determine who is sending the signal and the importance based on the authority rating embedded within the broadcaster request. Using the authority rating, the receiving device may then determine if the requested action should be performed. Still yet, according to some embodiments, certain mobile devices are configured so that they can be completely customizable. For example, mobile devices used by police officers, government agencies, doctors, and the like may be tagged or configured so that they are able to ignore or not allow certain broadcaster requests that a device with a user from the general public could not ignore.

If it is determined that the action is not able to be performed by the phone, the action will be ignored or not performed, processing block 450. If however, it is determined that an action is allowable, a prioritization of the allowable actions may be performed by the receiving device, processing block 460. The prioritization scheme used by one or more embodiments may consider and weight such factors as an affiliated importance of the request, resource utilization in order to process the request, effect the request will have on other requests, user-defined preferences, built-in system preferences, time the request was received, and/or other factors known to those skilled in the art. In some embodiments, a first in first out queue is used to set the order the requests will be processed. Once the priority level is set, the desired actions are performed 470 according to their associated priority level.

Figure 5:
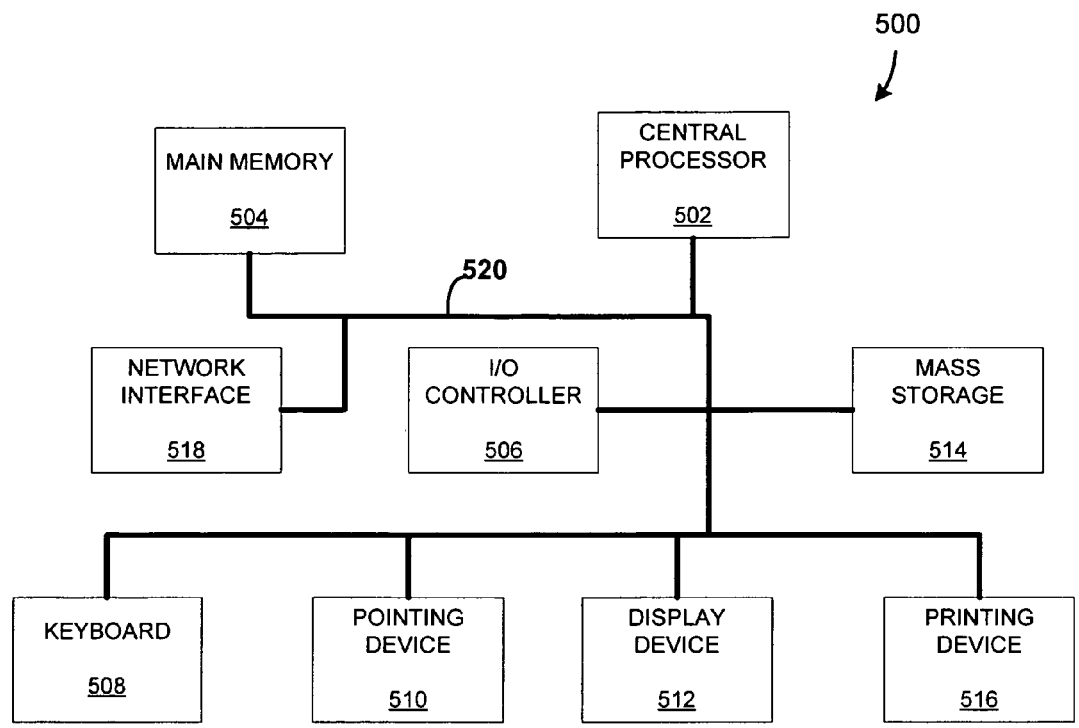
FIG. 5 illustrates one embodiment of a computer system.

FIG. 5 illustrates one embodiment of a computer system with which embodiments of the present invention may be utilized. The system 500 includes a central processor 502, a main memory 504, an input/output (I/O) controller 506, a keyboard 508, a pointing device 510 (e.g., mouse, track ball, pen device, or the like), a display device 512, a mass storage 514 (e.g., a nonvolatile storage such as a hard disk, an optical drive, and the like), and a network interface 518. Additional input/output devices, such as a printing device 516, may be included in the system 500 as desired. As illustrated, the various components of the system 500 communicate through a system bus 520 or similar architecture.

In a further embodiment, system 500 may be a distributed computing system. In other words, one or more of the various components of the system 500 may be located in a physically separate location than the other components of the system 500. Such components may be accessed and connected via a network to the other components In accordance with an embodiment of the present invention, the computer system 500 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 502 may be a complex instruction set computer (CISC) microprocessor, a reduced instruction set computing (RISC) microprocessor, a very long instruction word (VLIW) microprocessor, a processor implementing a combination of instruction sets, and the like.

The network interface 518 provides communication capability with other computer systems on a same local network, on a different network connected via modems and the like to the present network, or to other computers across the Internet. In various embodiments of the present invention, the network interface 518 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 500 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 500 is a general purpose computer capable of running any number of applications such as those available from companies including Oracle, Siebel, Unisys, Microsoft, and the like.

The embodiments of the present invention provide novel systems, methods and arrangements for controlling mobile devices. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
   receiving a Bluetooth signal at a wireless device, the signal including a broadcaster request to convey a set of desired actions to the wireless device and an authority rating, the authority rating comprising information included in the signal that indicates one of a plurality of categories and one of a plurality of subcategories indicating a rating of an authority associated with the broadcaster request;
   for each action in the set of desired actions conveyed by the broadcaster request, determining at the wireless device whether the action is allowable on the wireless device based on a comparison of both user preferences stored in the wireless device and the authority rating, whichever has priority, wherein at least one possible user preference has priority over at least one possible authority rating, and wherein at least one other possible authority rating has priority over at least one other possible user preference; and
   performing each of the actions which has been determined to be allowable on the wireless device.

2. The method of claim 1, further comprising:
   determining a priority level for each allowable action on the wireless device; and
   performing each allowable action in accordance with the determined priority level.

3. The method of claim 1, further comprising:
   determining at the wireless device if the broadcaster request includes a unique identifier associated with a group of wireless receiving devices; and
   wherein determining if the action is allowable includes determining whether the identifier of the broadcaster request matches an identifier of the wireless device and not allowing the action if no match is determined.

4. The method of claim 1, wherein the set of desired actions includes at least one action selected from a group including displaying an informational bulletin, disabling a feature of the receiving device, enabling a feature of the receiving device, and automatically altering a state of the receiving device.

5. The method of claim 1, wherein one of the desired actions included in the broadcaster request is to set a state of the wireless device to vibrate.

6. The method of claim 1, wherein one of the desired actions included in the broadcaster request is to set a state of the wireless device to a loudest possible ring.

7. The method of claim 1, wherein one of the desired actions included in the broadcaster request is to disable all outgoing calls except outgoing calls to emergency services.

8. The method of claim 1 wherein determining whether the action is allowable includes determining whether the device includes a tag allowing the device to ignore the desired actions of the broadcaster request regardless of the authority rating.

9. A method comprising:
   embedding one or more broadcaster requests into a signal including an authority rating, the authority rating comprising information included in the signal that indicates one of a plurality of categories and one of a plurality of subcategories indicating a rating of an authority which has authorized the one or more broadcaster requests; and
   broadcasting the one or more broadcaster requests including the authority rating in a Bluetooth signal to convey one or more desired actions to a receiving device, wherein the receiving device includes stored user preferences and determines whether the one or more desired actions is allowable on the receiving device based on a comparison of both the stored user preferences and the authority rating, whichever has priority, wherein at least one possible user preference has priority over at least one possible authority rating, and wherein at least one other possible authority rating has priority over at least one other possible user preference.

10. The method of claim 9, further comprising receiving one or more broadcaster requests conveying one or more desired actions to a receiving device.

11. The method of claim 10 further comprising:
    determining a priority level for each allowable action on the receiving device; and
    performing each allowable action in accordance with the determined priority level.

12. The method of claim 9, further comprising:
    receiving a location identifier from a location identifier broadcaster; and
    embedding the location identifier into the Bluetooth signal.

13. The method of claim 9, wherein the one or more broadcaster requests are selected from a group including displaying an informational bulletin, disabling a feature of the receiving device, enabling a feature of the receiving device, and automatically altering a state of the receiving device.

14. The method of claim 9, wherein one of the desired actions of the broadcaster request is to disable all outgoing calls except outgoing calls to emergency services.

15. The method of claim 9 wherein the receiving devices determines whether the one or more desired actions is allowable on the device based on whether the device includes a tag allowing the device to ignore the desired actions of the broadcaster request regardless of the authority rating.

16. A non-transitory computer-readable storage medium containing a set of instructions capable of causing one or more processors to:
- receive a Bluetooth signal at a wireless device, the signal including a broadcaster request to convey a set of desired actions to a receiving device and an authority rating, the authority rating comprising information included in the signal that indicates one of a plurality of categories and one of a plurality of subcategories indicating a rating of an authority associated with the broadcaster request;
- for each action in the set of desired actions conveyed by the broadcaster request, determine at the receiving device whether the action is allowable on the receiving device based on a comparison of both user preferences stored in the device and the authority rating, whichever has priority, wherein at least one possible user preference has priority over at least one possible authority rating, and wherein at least one other possible authority rating has priority over at least one other possible user preference; and
- perform each of the actions which has been determined to be allowable on the receiving device.

17. The computer-readable storage medium of claim 16 further comprising instructions to cause one or more processors to:
- determine a priority level for each allowable action on the receiving device; and
- perform each allowable action in accordance with the determined priority level.

18. The computer-readable storage medium of claim 16, wherein the set of desired actions includes at least one action selected from a group including displaying an informational bulletin, disabling a feature of the receiving device, enabling a feature of the receiving device, and automatically altering a state of the receiving device.

19. The computer-readable storage medium of claim 16, wherein one of the desired actions of the broadcaster request is to disable all outgoing calls except outgoing calls to emergency services.

20. The computer-readable storage medium of claim 16 wherein to determine whether the action is allowable on the receiving device, the storage medium contains a set of instructions capable of causing one or more processors to determine whether the device includes a tag allowing the device to ignore the desired actions of the broadcaster request regardless of the authority rating.

\* \* \* \* \*

UNITED STATES PATENT AND TRADEMARK OFFICE
CERTIFICATE OF CORRECTION

| | | |
|---|---|---|
| PATENT NO. | : 9,060,071 B1 | Page 1 of 1 |
| APPLICATION NO. | : 11/497955 | |
| DATED | : June 16, 2015 | |
| INVENTOR(S) | : Wagner | |

It is certified that error appears in the above-identified patent and that said Letters Patent is hereby corrected as shown below:

In the Specification

In column 10, line 52, after "components" insert -- . --.

Signed and Sealed this
Twelfth Day of April, 2016

Michelle K. Lee
*Director of the United States Patent and Trademark Office*